(12) United States Patent
Takao

(10) Patent No.: US 8,904,434 B2
(45) Date of Patent: Dec. 2, 2014

(54) INFORMATION DISPLAY APPARATUS AND INFORMATION DISPLAY METHOD

(71) Applicant: Kabushiki Kaisha Toshiba, Tokyo (JP)

(72) Inventor: Yuji Takao, Hino-hi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/780,455

(22) Filed: Feb. 28, 2013

(65) Prior Publication Data

US 2013/0242193 A1    Sep. 19, 2013

(30) Foreign Application Priority Data

Mar. 13, 2012 (JP) ................................. 2012-056510

(51) Int. Cl.
- *H04N 5/445* (2011.01)
- *H04N 21/4788* (2011.01)
- *H04N 21/482* (2011.01)

(52) U.S. Cl.
CPC ....... *H04N 5/44513* (2013.01); *H04N 5/44543* (2013.01); *H04N 21/4788* (2013.01); *H04N 21/482* (2013.01); *H04N 2005/44556* (2013.01)
USPC .................................. 725/39; 725/40; 725/43

(58) Field of Classification Search
USPC ................................................ 725/39, 40, 43
See application file for complete search history.

(56) References Cited

U.S. PATENT DOCUMENTS

| 7,747,696 | B2 | 6/2010 | Asazu et al. | |
|---|---|---|---|---|
| 7,987,481 | B2 * | 7/2011 | Fukuda et al. | 725/39 |
| 2004/0068740 | A1 * | 4/2004 | Fukuda et al. | 725/45 |
| 2006/0101491 | A1 | 5/2006 | Tsuruta et al. | |
| 2006/0259923 | A1 * | 11/2006 | Chiu | 725/24 |
| 2007/0250866 | A1 | 10/2007 | Yamada | |
| 2009/0007174 | A1 * | 1/2009 | Fukuda et al. | 725/39 |
| 2009/0112935 | A1 * | 4/2009 | Hefta-Gaub | 707/200 |

FOREIGN PATENT DOCUMENTS

| JP | 2004-030327 | 1/2004 |
|---|---|---|
| JP | 3747884 | 12/2005 |
| JP | 2006197356 | 7/2006 |
| JP | 200727605 | 10/2007 |
| JP | 2009200918 | 9/2009 |
| JP | 2011-228848 | 11/2011 |

OTHER PUBLICATIONS

Japanese Patent Application No. 2012-056510, Notice of Reasons for Refusal, mailed May 21, 2013, (with English Translation).

* cited by examiner

*Primary Examiner* — Kieu Oanh T Bui

(74) *Attorney, Agent, or Firm* — Blakely, Sokoloff, Taylor & Zafman LLP

(57) ABSTRACT

According to one embodiment, an information display apparatus, comprising: a first display controller configured to display a broadcasting station information to identify a plurality of broadcasting stations on a screen; a acquiring module configured to acquire one or more short comments with respect to the broadcasting station information from a server connected through a network; and a second display controller configured to display the one or more short comments on the screen on each of the plurality of broadcasting stations.

29 Claims, 15 Drawing Sheets

INFORMATION DISPLAY APPARATUS AND INFORMATION DISPLAY METHOD

CROSS REFERENCE TO RELATED APPLICATION(S)

The application is based upon and claims the benefit of priority from Japanese Patent Application No. 2012-056510 filed on Mar. 13, 2012; the entire contents of which are incorporated herein by reference.

FIELD

Embodiments described herein relate generally to an information display apparatus and an information display method.

BACKGROUND

In recent years, digital terrestrial broadcasts and digital BS/CS broadcasts have been operated in earnest, and as a result, an environment in which a lot of programs can be watched with high image quality and high sound quality has been prepared. The digital broadcast, which has a structure of an electronic program guide (EPG), can display the program guide up to a current day or one week and display contents of programs such as a broadcasting time or performers, or retrieve information to be desired, and reserve watching or recording of the programs, by pressing a button on a remote controller for a receiver.

A digital broadcast receiver such as a television set is loaded with many functions including a function of receiving broadcast programs, and can acquire various information through a network such as the internet by utilizing a communication function. It is also proposed that opinions and impressions of general viewers regarding broadcast programs may be collected by acquiring information written on a bulletin board or a blog through the network.

BRIEF DESCRIPTION OF THE DRAWINGS

Exemplary embodiments of the present invention will be described in detail based on the following figures, wherein.

DETAILED DESCRIPTION OF THE EXEMPLARY EMBODIMENTS

According to one embodiment, an information display apparatus, comprising: a first display controller display configured to display a plurality of broadcasting station information representing a plurality of broadcasting stations on a screen; an acquiring module configured to acquire short comments with respect to the broadcasting station information from a server connected through a network; and a second display controller configured to display the short comments on the screen on each of the plurality of broadcasting stations.

Hereinafter, exemplary embodiments of the present invention will be described with reference to the accompanying drawings.

First Exemplary Embodiment

Figure 1:
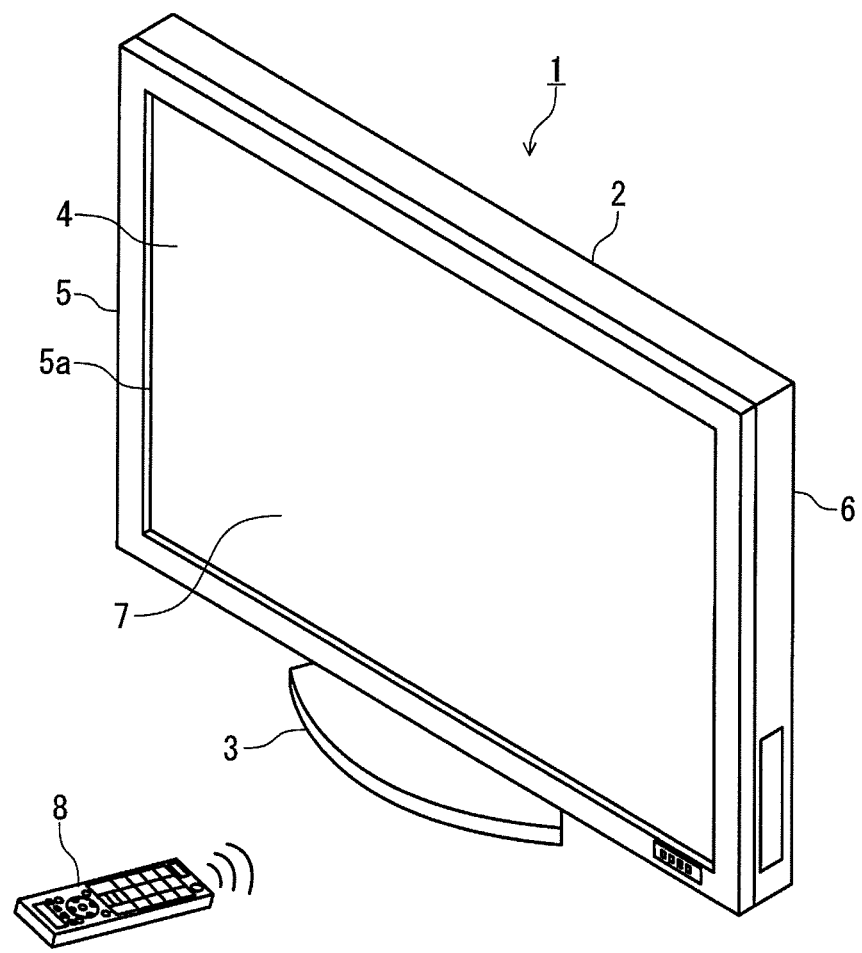
FIG. 1 is an external perspective view of an information display apparatus according to a first exemplary embodiment.

FIG. 1 illustrates an external perspective view of an information display apparatus according to a first exemplary embodiment. The information display apparatus 1 is an information display apparatus such as a digital television that receives a digital broadcast, can record and playback a received broadcast program, and displays an image of the broadcast program on a screen. The information display apparatus 1 may be a personal computer, a tablet terminal and the like that can receive the digital broadcast to playback and display the received digital broadcast.

The information display apparatus 1 includes a case 2 and a stand 3 supporting the case 2. A display panel 4 such as a liquid crystal panel or a plasma display panel (PDP) is placed on a front surface of the case 2, and a frame (not illustrated) supporting the display panel 4 is placed on a back surface of the display panel 4. A circuit board or a power circuit (not illustrated) for driving the display panel 4 is installed in the frame.

An outer surface of the case 2 is surrounded by a front cover 5 covering the front surface, a portion of a top surface, a bottom surface, and both side surfaces of the case 2, and a back surface cover 6 covering the back surface and a portion of the top surface, the bottom surface, and both sides surfaces of the case 2. A screen 7 is an internal display part of a window 5a of the front cover 5 of the display panel 4.

A remote controller 8 is an operating device that transmits an operating signal to an operation receiving unit of the information display apparatus 1 using a wireless communication by infrared rays or Bluetooth (registered trademark).

Figure 2:
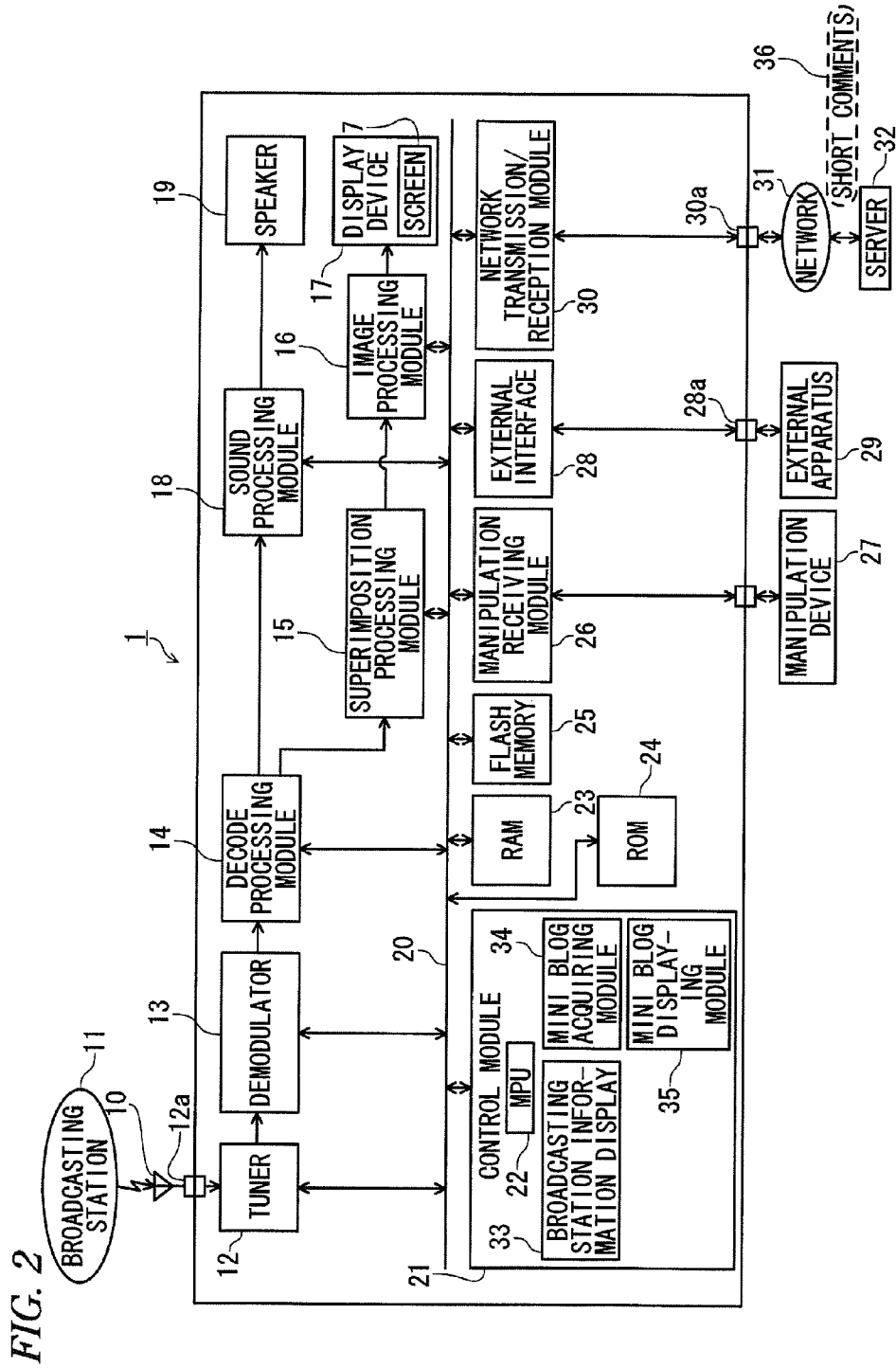
FIG. 2 is a block diagram illustrating a configuration of the information display apparatus according to the first exemplary embodiment.

FIG. 2 is a block diagram illustrating the configuration of the information display apparatus 1 according to the exemplary embodiment. An antenna 10 is an antenna for a digital terrestrial broadcast or a digital satellite broadcast for receiving a broadcasting wave transmitted from a broadcasting station 11. A tuner 12 selects a broadcasting signal of a desired channel among broadcasting signals of the digital terrestrial broadcasts, the digital satellite broadcasts, and a cable TV broadcast. The tuner 12 is constituted by a plurality of tuner units and may receive a plurality of broadcasts simultaneously. An antenna terminal 12a is a terminal connected with the antenna 10. The antenna 10 may be installed in the case 2.

A demodulator 13 performs demodulation corresponding to a demodulation mode of each digital broadcast. The signal of the digital terrestrial broadcast is demodulated by an orthogonal frequency division multiplexing (OFDM) demodulator, the signal of the digital satellite broadcast is demodulated by a phase shift keying (PSK) demodulator, and the signal of the cable TV broadcast is demodulated into moving picture experts group (MPEG)—transport stream (TS), so that the demodulated signals are output to a decode processing module 14. Further, the demodulator 13 demodulates an IP broadcast received from a network 31 such as the Internet through a network transmission/reception module 30.

The decode processing module 14 has functions of an MPEG decoder, an image/sound decoder and the like. The decode processing module 14 sectionizes MPEG-TS data transmitted from the demodulator 13 and decodes data of program information. An image packetized elementary stream (PES) is made into a sectionized image elementary stream (ES), and a sound PES is made into a sectionized sound ES to decode image data and sound data. Further, the decode processing module 14 serves to decode the image data and the sound data input from an external apparatus 29 through an external interface 28.

A superimposition processing module 15 plain-manages the image data from the decode processing module 14, and a data broadcast transmitted through a bus 20 or a Windows drawing by graphical user interface (GUI) information, and superimpose the plain-managed image data, the data broadcast and the Windows drawing with the image data, and thereafter, transmits the superimposed data to an image processing module 16.

The image processing module 16 converts the superimposed data into a format (the number of pixels, a frame frequency and a scanning method) which can be displayed by a display device 17, or arbitrarily adjusts a display color, and thereafter, outputs the corresponding data to the display device 17 to display the image on the screen 7.

A sound processing module 18 converts the digital sound data transmitted from the decode processing module 14 into an analog sound signal which can be played-back through a speaker 19 or an earphone, and then outputs the converted analog sound signal to a speaker 20 or the earphone to playback sound. The display device 17 or the speaker 19 may be positioned outside the information display apparatus 1 and, further, may be contained in a case separated from the information display apparatus 1.

In the information display apparatus 1, all operations including the receiving operation is comprehensively managed and controlled by a control module 21. The control module 21 is mounted with a micro processing unit (MPU) 22 and controls each component connected through the bus 20.

A random access memory (RAM) 23 is a readable/writable memory storing various data required for data processing of the control module 21 and operates as a buffer memory storing image data, information of an image frame and the like. A read only memory (ROM) 24 stores a control program executed by the MPU 22.

A flash memory 25 is a non-volatile memory which is rewritable, and in which data is not erased even though a power supply is turned OFF. The flash memory 25 serves to store various setting values with respect to a function and an operation of the information display apparatus 1 set by a user. The flash memory 25 serves to store EPG data, service information (SI, program arrangement information) creating the EPG, and the like.

A manipulation receiving module 26 receives a manipulation signal transmitted from a manipulation device 27 to transmit the received manipulation signal to the control module 21. The manipulation device 27 is a remote controller 8 using the wireless communication by for example, the infrared ray or Bluetooth (registered trademark) or a wired or wireless keyboard, and transmits the manipulation signal to the manipulation receiving module 26. The manipulation receiving module 26 receives the manipulation signal from the remote controller 8 or the keyboard.

An external interface 28 is an interface such as a universal serial bus (USB), institute of electrical and electronic engineers 1394 (IEEE1394), external serial AT attachment (ATA) (eSATA), a secure digital (SD) (registered trademark) memory card, a memory stick (registered trademark), or a high definition multimedia interface (HDMI) (registered trademark), and is connected with an external apparatus 29 including a USB memory or a USB external apparatus, the SD memory card, the memory stick, and drives including an HDD, an SSD, a CD, a DVD, a Blu-ray (registered trademark) player and the like. The external apparatus 29 is connected to an external apparatus terminal 28a.

The information display apparatus 1 may record the broadcast program in the external apparatus 29 through the external interface 28. The information display apparatus 1 may playback image or sound information recorded in the external apparatus 29.

The information display apparatus 1 may be connected to a network 31 such as the Internet through the network transmission/reception module 30. As a result, the information display apparatus 1 may transmit and receive information to and from an apparatus such as a server 32 on the network 31 through the network transmission/reception module 30. The network 31 is connected to a network terminal 30a. The network transmission/reception module 30 and the network 31 are connected to each other in a wired method and through a wireless connection such as for example, a wireless LAN using a communication scheme for IEEE802.11 series.

In FIG. 2, the control module 21 performs functions of a broadcasting station information display (an example of first display controller) 33, a mini blog acquiring module (an example of acquiring module) 34 and a mini blog displaying module (an example of second display controller) 35. The functions, as applications executed by the MPU 22 of the control module 21, are generally stored in the ROM 24, and read and executed by the MPU 22 while in use.

The broadcasting station information display 33 serves to display a broadcasting station information which includes channel numbers or broadcasting station names of a plurality of broadcasting stations on the screen 7. The broadcasting station information display 33 generates a GUI screen of the channel number or the broadcasting station name by acquiring the broadcasting station information of the broadcast program and the broadcasting station name from program specific information (PSI) and SI (program arrangement information) of a received broadcast wave. The generated GUI data are displayed on the screen 7 through the superimposition processing module 15 and the image processing module 16.

The mini blog acquiring module 34 serves to acquire short comments 36 with respect to the broadcasting station from a server 32 of a website of a mini blog connected through the network 31. The mini blog, as one of types of a web service, is designed to not post a comprehensive sentence such as a blog but post a short sentence. Users in the mini blog communicate with each other. One example of a representative website of the mini blog includes TWITTER (registered trademark).

The short comments 36 is information in which immediate action contents or miscellaneous opinions are posted to the mini blog using a mini blogging web service as a short simple sentence constituted by tens of letters to hundreds of letters, by the user. The user embeds and posts a common character string (hereinafter, referred to as a specific character string) specifying the broadcasting station name or a program title in the posted short comments 36. Posting may represent the specified broadcasting station or program. In general, the users reach an agreement on the specific character string, which is defined as one meaning.

The mini blog acquiring module 34 may retrieve the short comments including the specific character string regarding the broadcasting station name from the received short comments 36 to extract the short comments 36 with respect to the broadcasting station. Further, the mini blog acquiring module 34 may acquire the short comments 36 by using a retrieval function provided by the website of the mini blog.

The mini blog displaying module 35 serves to display the short comments 36 retrieved and extracted by the mini blog acquiring module 34 on the screen 7 for each broadcasting station. The mini blog displaying module 35 generates the GUI screen of new short comments 36 which is frequently acquired, and the generated GUI data are displayed on the screen 7 through the superimposition processing module 15 and the image processing module 16.

Figure 3:
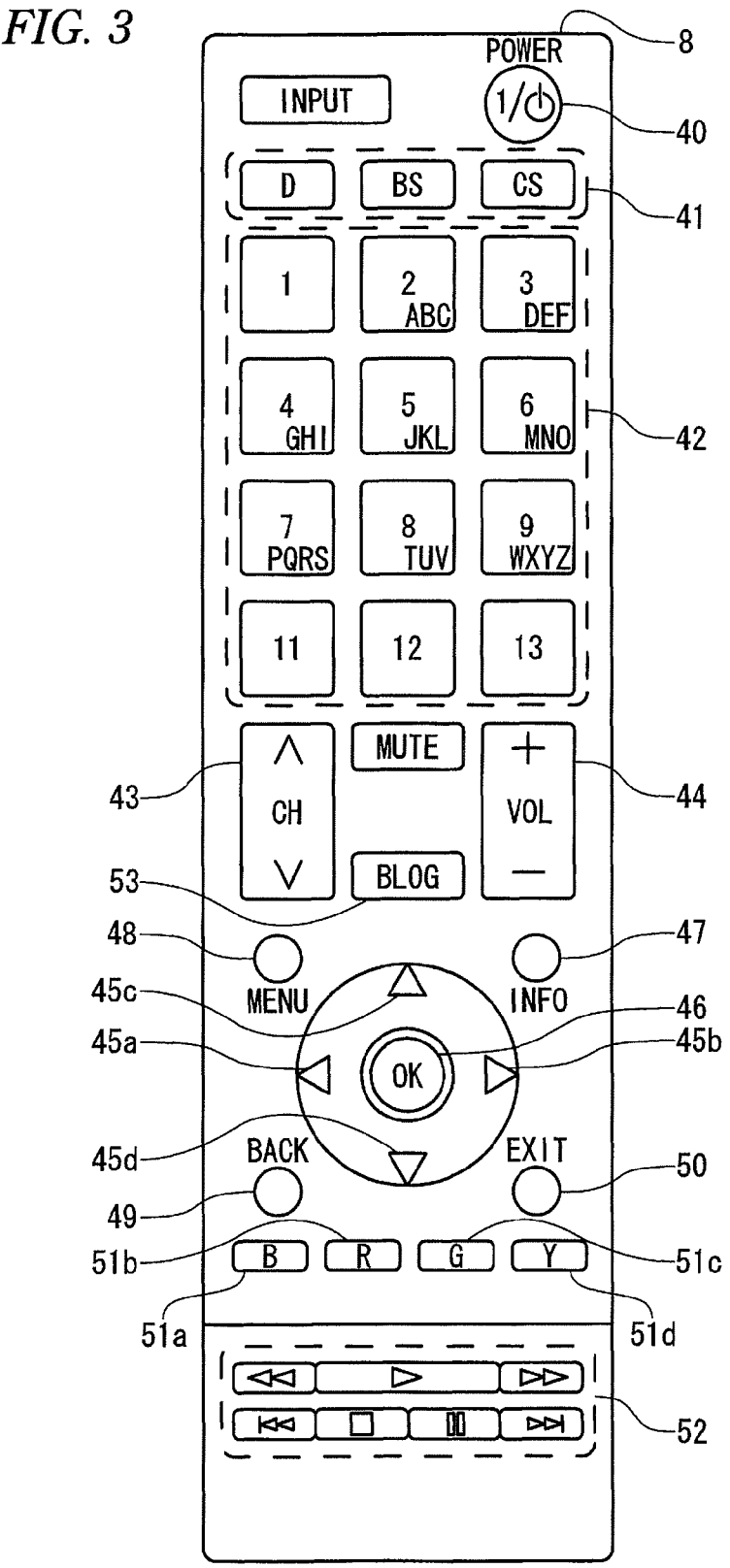
FIG. 3 is a diagram illustrating an appearance of a remote controller according to the first exemplary embodiment.

FIG. 3 is a diagram illustrating an appearance of the remote controller 8 according to the exemplary embodiment. The remote controller 8 transmits the manipulation signal to the manipulation receiving module 26 of the information display apparatus 1 using the wireless communication by the infrared rays or Bluetooth (registered trademark). A power supply button 40 is manipulated to turn ON or OFF the power supply of the information display apparatus 1. Specifically, the power supply button 40 is a button that switches a standby state to an operating state, or vice versa. A broadcast wave selecting button 41 is an operating button to select a type of a broadcast.

A channel selection button 42 is a button marked with numbers 1 to 12 to directly select channel numbers of the broadcast. A channel transmission button 43 is a button to select the channel numbers through forward transmission or backward transmission, and is used to select the channel like the channel selection button 42. A volume control button 44 is a button to control the volume of the speaker at the time of watching the program.

A cursor button 45 is a button for moving a cursor within various kinds of information windows or moving the selection button of various items on the GUI screen displayed on the screen 7. The cursor button 45 is also called a cross button or a direction indication button. A left direction cursor button 45a is used to move the cursor in a left direction. A right direction cursor button 45b, an upper direction cursor button 45c and a lower direction cursor button 45d are used to move the cursor in a right direction, an upper direction and a lower direction, respectively. A determination button 46 is used to execute a button at a position moved from the cursor buttons 45a to 45d or on the screen.

A program guide button 47 is an exclusive manipulation button manipulated at the time of displaying the program guide on the screen 7. A menu button 48 is pressed to display various setting menus prepared in the information display apparatus 1. The user selects a desired setting item among a plurality of items which are hierarchically displayed by using the cursor button 45. A return button 49 is used to return to a screen at next to before manipulating step. An end button 50 is a button operated to end a series of manipulations.

As four color buttons 51, a blue button 51a, a red button 51b, a green button 51c, and a yellow button 51d are placed from the left in sequence. The four-color buttons 51 are used when an item discriminated by a color or selection by the color is displayed on the screen 7. A recording device operating button 52 is used to perform playing back, stopping, pausing, fastforward playing, rewind playing, next program skipping, returning to head and previous program skipping, at the time of playing back the program recorded in the external apparatus 29 connected to the information display apparatus 1 through the external interface 28.

A mini blog display module button 53 is a manipulation button used to display a plurality of broadcasting station names and short comments 36 with respect to the broadcasting station names for each broadcasting station on the screen 7. The mini blog display module button 53 is used to allow for the user to read the short comments 36 with respect to each broadcasting station.

Figure 4:
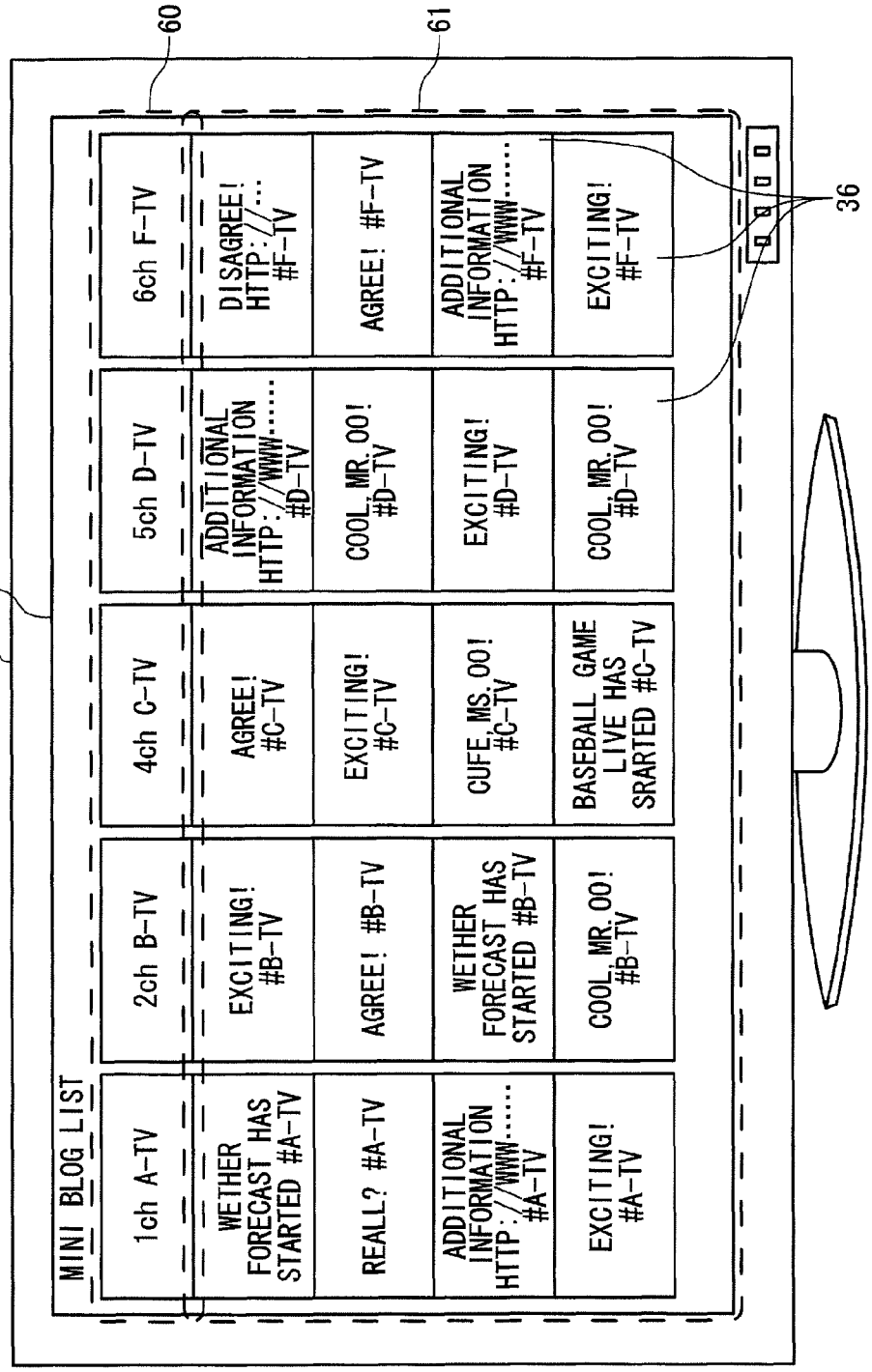
FIG. 4 is a diagram illustrating a state in which a plurality of broadcasting station names and short comments for each broadcasting station are displayed on a screen.

FIG. 4 is a diagram illustrating a state in which the plurality of broadcasting station names and the short comments 36 for each broadcasting station are displayed on the screen 7. A broadcasting station name display area 60 is placed on the top of the screen 7, and both the channel numbers and the broadcasting station names are displayed in a horizontal direction of the screen 7. Short comments display area 61 is placed below the broadcasting station name display area 60. All the short comments with respect to the broadcasting station are chronologically displayed in a vertical direction of the screen 7. In FIG. 4, the short comments is displayed as a title of 'mini blog list'.

In FIG. 4, as examples of the broadcasting station names, 5 channels of 1 ch A-TV, 2 ch B-TV, 4 ch C-TV, 5 ch D-TV and 6 ch F-TV are displayed. The short comments 36 is placed below each broadcasting station name, but when new short comments 36 are frequently posted, a newly posted short comments is displayed right under the broadcasting station name, and each of the short comments 36 displayed at that time is displayed by being moved down sequentially by one layer. Therefore, the short comments 36 displayed on a lowermost end at that time is not displayed on the screen 7. However, by scrolling the screen 7 down, the short comments 36 which is not displayed by being moved down may be displayed.

As the broadcasting station name, all broadcasting station names which the information display apparatus 1 can receive may be displayed, and for example, only the broadcasting station of the digital terrestrial broadcast may be displayed and further, only the broadcasting station of the BS broadcast may be displayed. Two or more broadcasting stations names may be displayed.

When a lot of broadcasting stations intend to be displayed, some of the broadcasting stations may be cut on the screen 7. As a result, in this case, the broadcasting stations may be viewed by scrolling the screen horizontally. The broadcasting station may be limited when scrolling intends to be avoided. A method for limiting the broadcasting station may include a method for limiting the broadcasting station by allowing the user to select the broadcasting station, in addition to a method for limiting the broadcasting station by the types of the broadcasts of the digital terrestrial broadcast, the BS broadcast and the CS broadcast. The broadcasting stations may be displayed in the descending order of the number of acquired short comments 36 or a broadcasting station in which the number of acquired short comments 36 is large may be preferentially displayed. For example, current viewing rate data are acquired from a website which opens a viewing rate, and a broadcasting station in which the current viewing rate is high may be preferentially displayed.

The user reads the short comments 36 including the specific character string and may verify which opinion another user has with respect to the broadcasting station. For example, when the broadcasting station in which the number of acquired short comments 36 is large is preferentially displayed, the user may read more short comments 36, having a more pleasant experience. By reading the short comments 36, a broadcasting station which is at issue may be guessed. Therefore, when selecting the broadcasting station, the user may easily and rapidly select a broadcasting station that broadcasts a program suitable for user's taste.

When the channel number or the broadcasting station name displayed on the screen 7 in FIG. 4 is directed to be displayed on the screen 7 by the manipulation device 27, the control module 21 serves to display the broadcast program of the corresponding channel number or the corresponding broadcasting station on the screen 7. While the short comments are being displayed throughout the screen as illustrated in FIG. 4, when the user selects the channel number or the broadcasting station which the user intends to watch by using the cursor button 45 of the remote controller 8 and presses the determination button 46, the broadcast program of the channel number or the broadcasting station is displayed.

Figure 5:
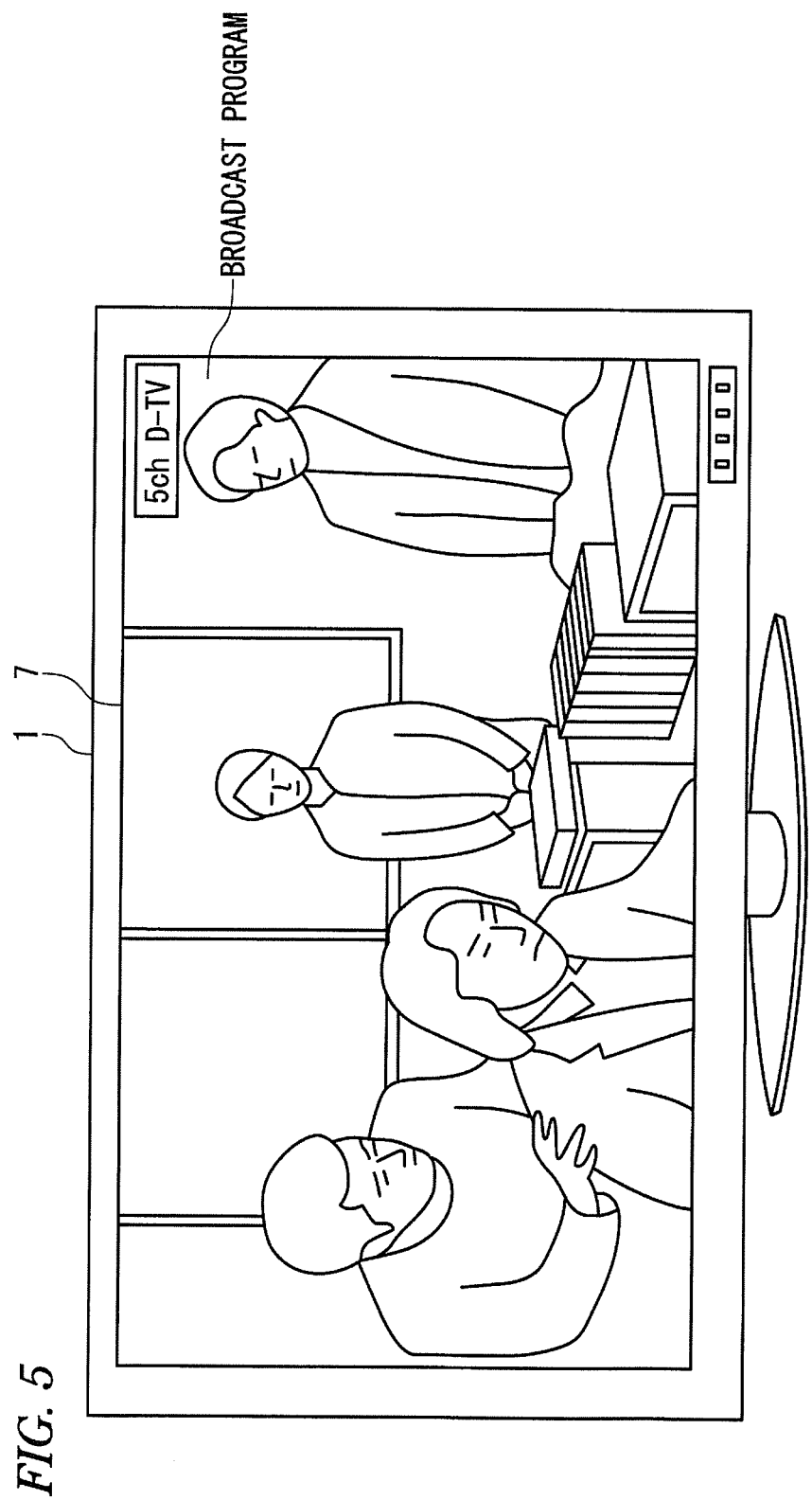
FIG. 5 is a diagram illustrating a state in which a broadcast program is displayed throughout the screen.

FIG. 5 is a diagram illustrating a state in which the broadcast program is displayed throughout the screen 7. When the user selects and determines the broadcasting station which the user intends to watch by the remote controller 8, the broadcast program of the selected broadcasting station is displayed throughout the screen 7. The user may enjoy a broadcast program which the user intends to watch through a large screen. In FIG. 5, the broadcast program of the 5 ch D-TV is displayed.

When the user presses the mini blog display module button 53 of the remote controller 8, the short comments 36 is displayed for each broadcasting station again. Since the selected broadcast program or a list of the short comments may be displayed, by manipulating the remote controller once, switching between displaying of short comments information and displaying of the program may be performed simply and easily.

Figure 6:
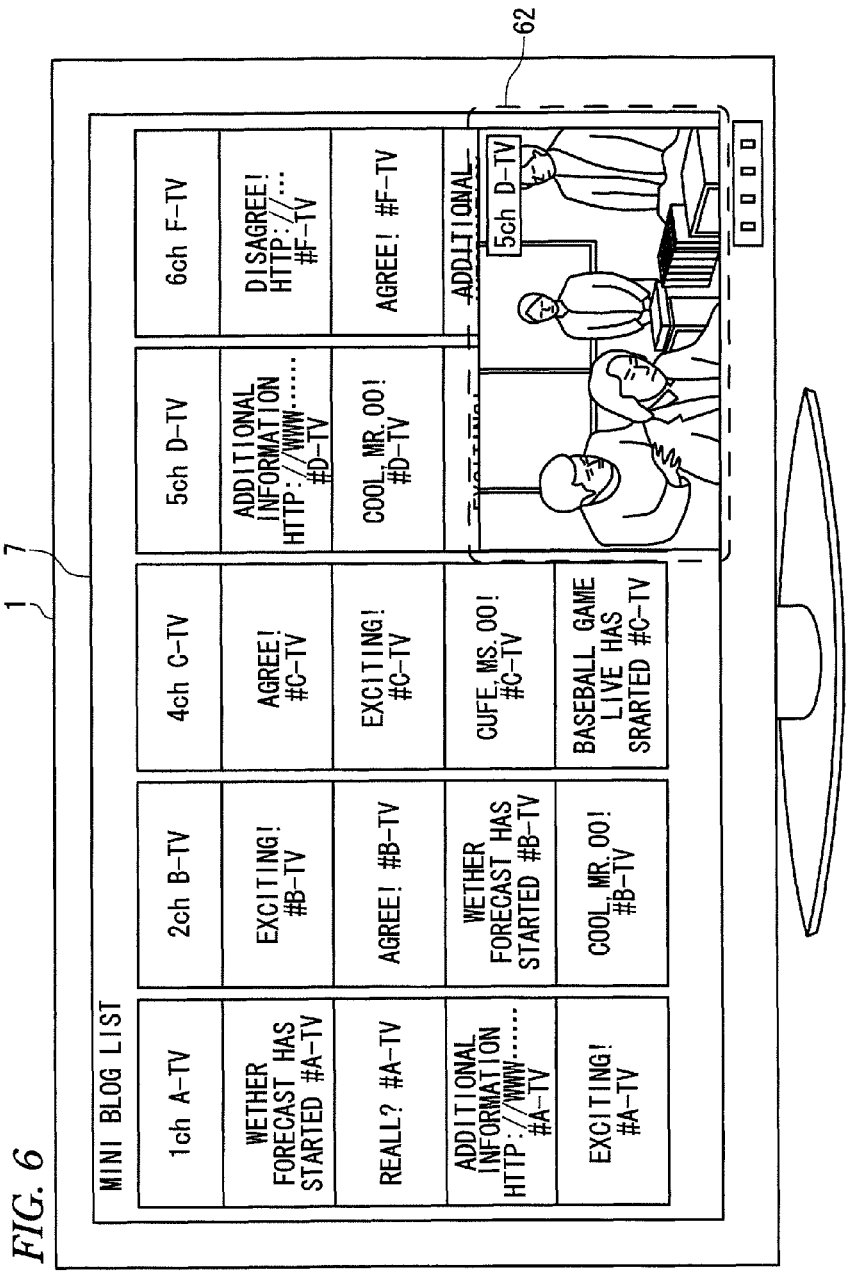
FIG. 6 is a diagram illustrating a state in which the broadcast program is displayed on a part of the screen.

FIG. 6 is a diagram illustrating a state in which the broadcast program is displayed on a part of the screen 7. When the user selects and determines the broadcasting station which the user intends to watch by using the remote controller 8, the broadcast program of the selected broadcasting station name is displayed on the part of the screen 7. Since the user may watch the broadcast program as well as reading the short comments 36, the user enjoys reading even short comments of another broadcasting station while preparing the short comments of the watching broadcast program. FIG. 6 illustrates a state in which a program display area 62 is placed to be superimposed on a displayed part of the short comments 36 of the 5 ch D-TV and the broadcast program of the 5 ch D-TV broadcast program is displayed.

Switching between the full screen display illustrated in FIG. 5 and the partial screen display illustrated in FIG. 6 may be set by a setting menu. The user may set the switching by selecting a setting item with respect to the screen display of the broadcast program among setting items with respect to the mini blog list among the hierarchically displayed items, by pressing the menu button 48 of the remote controller 8.

Figure 7:
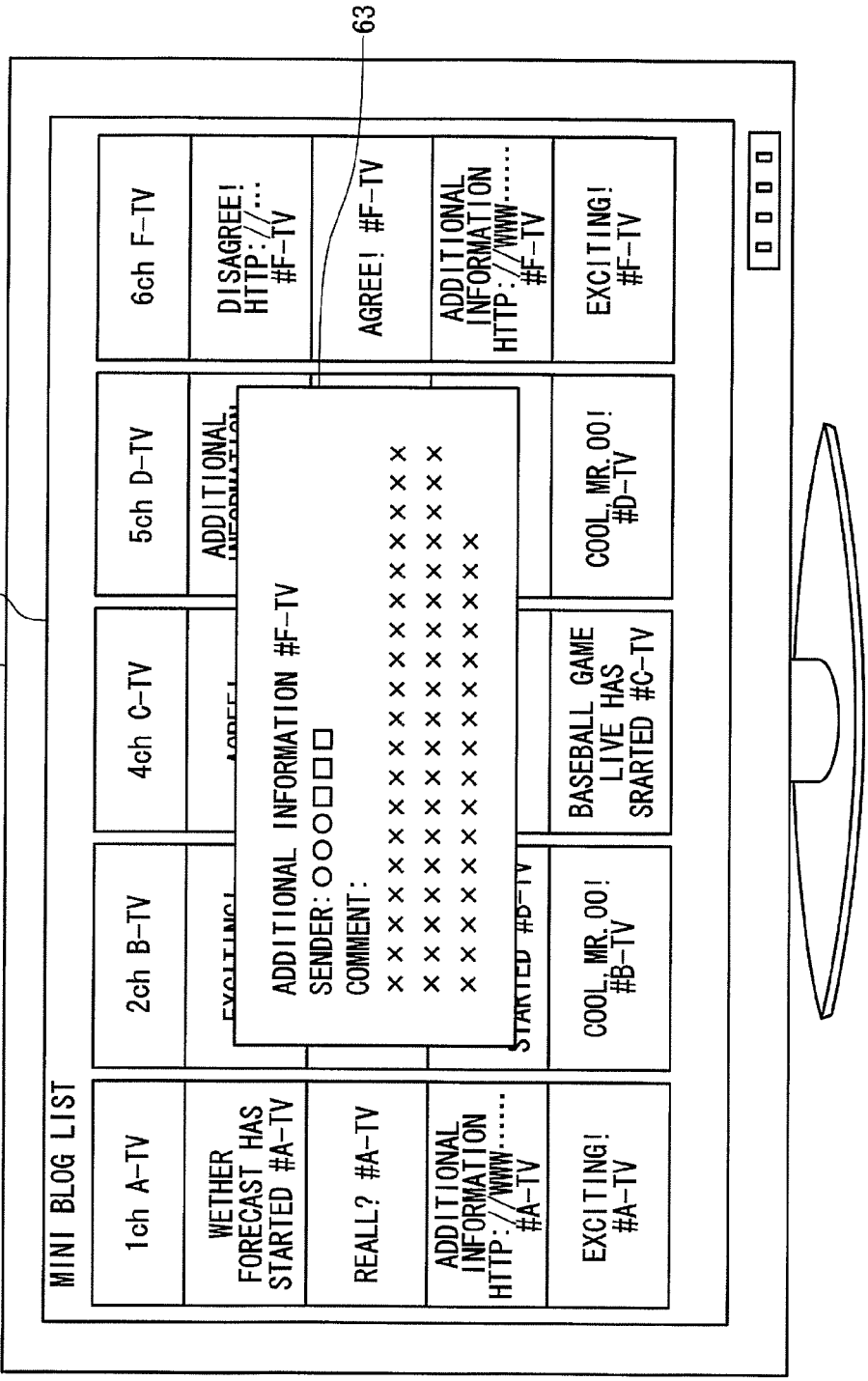
FIG. 7 is a diagram illustrating a state in which details of additional information are displayed on a part of the screen.

FIG. 7 is a diagram illustrating a state in which details of additional information are displayed on a part of the screen 7. When the short comments 36 is omitted in the short comments display area 61 and thus only some of the short comments 36 are displayed, all the short comments 36 are displayed. The short comments 36 having a uniform resource locator (URL) described thereon including the additional information may be present opinions, and when the user presses the determination button 46 by selecting the short comments 36 with the URL by means of the cursor button 45 of the remote controller 8, an additional information display area 63 appears on a part of the screen 7 and details of additional information is displayed therein. In FIG. 7, an additional information display area 63 is placed at the center of the screen 7. The return button 49 of the remote controller 8 may be pressed to return to a screen at next to before operating step.

Figure 8:
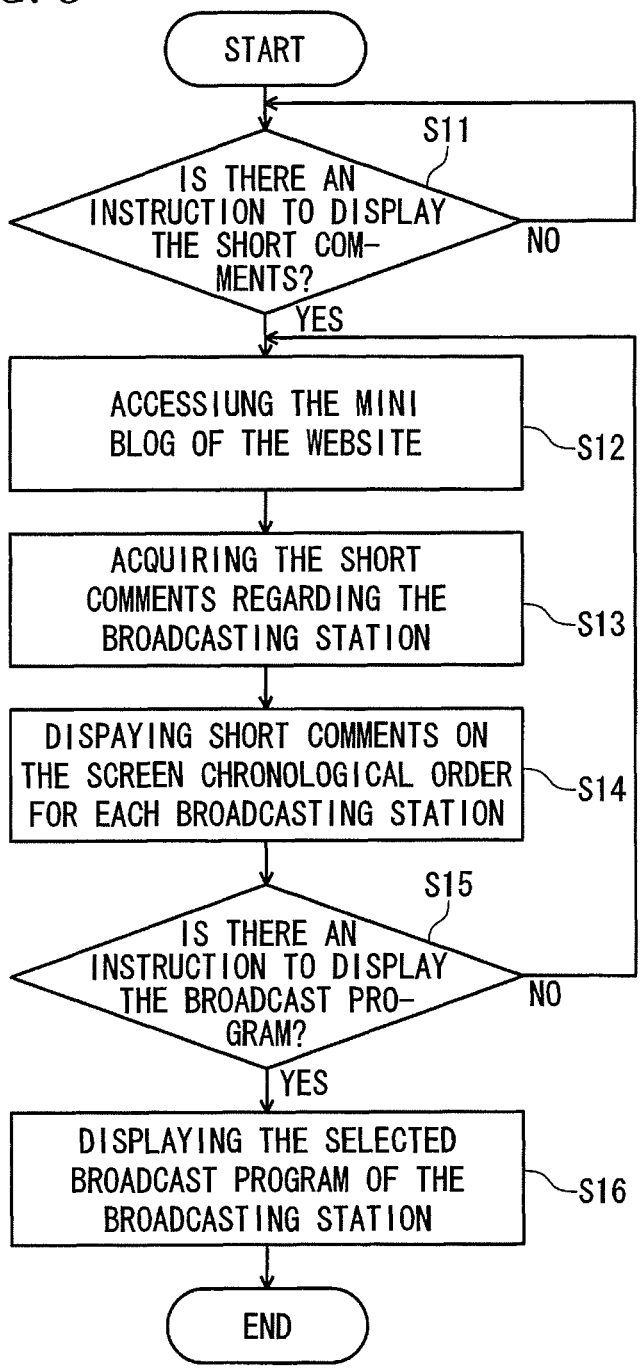
FIG. 8 is a flowchart illustrating an operational sequence of displaying the short comments according to the first exemplary embodiment.

FIG. 8 is a flowchart illustrating an operational sequence of displaying the short comments according to the first exemplary embodiment. When the user presses the mini blog display module button 53 of the remote controller 8, the operation of displaying of the short comments 36 is started.

In S11, the control module 21 judges whether there is an instruction to display the short comments. When there is the display instruction, the process proceeds to S12, and when there is no display instruction, the process returns to S11.

In S12, the mini blog acquiring module 34 accesses the website of the mini blog. In S13, the mini blog acquiring module 34 extracts and acquires the short comments 36 regarding the broadcasting station by retrieving the specific character string regarding the broadcasting station name.

In S14, the broadcasting station information display 33 displays the channel numbers or broadcasting station names of the plurality of broadcasting stations on the screen 7. And the mini blog displaying module 35 displays the short comments 36 on the screen 7 in chronological order for each of the broadcasting station.

In S15, the control module 21 judges whether there is an instruction to display the broadcast program. When there is the display instruction, the process proceeds to S16, and when there is no display instruction, the process returns to S12. In S16, the control module 21 displays the broadcast program of the broadcasting station name which the user selects and determines by using the remote controller 8, and ends the process.

According to the exemplary embodiment described above, the user may see at a glance what topic is in association with a receivable broadcasting station. Since there is relatively increased the amount of short comments with respect to a broadcasting station which is popular to the user, in which popular programs are broadcasted, a popularity level may be seen at a glance. Another user presents complementary information which is not broadcasted, and as a result, the user may see the information easily. Since the selected broadcast program may be displayed or the list of the short comments may be displayed, by operating the remote controller once, displaying of short comments and displaying of the program may be switched simply and easily. When selecting the broadcasting station or the broadcast program, the user may select the broadcasting station or the broadcast program easily or rapidly.

Second Exemplary Embodiment

Figure 9:
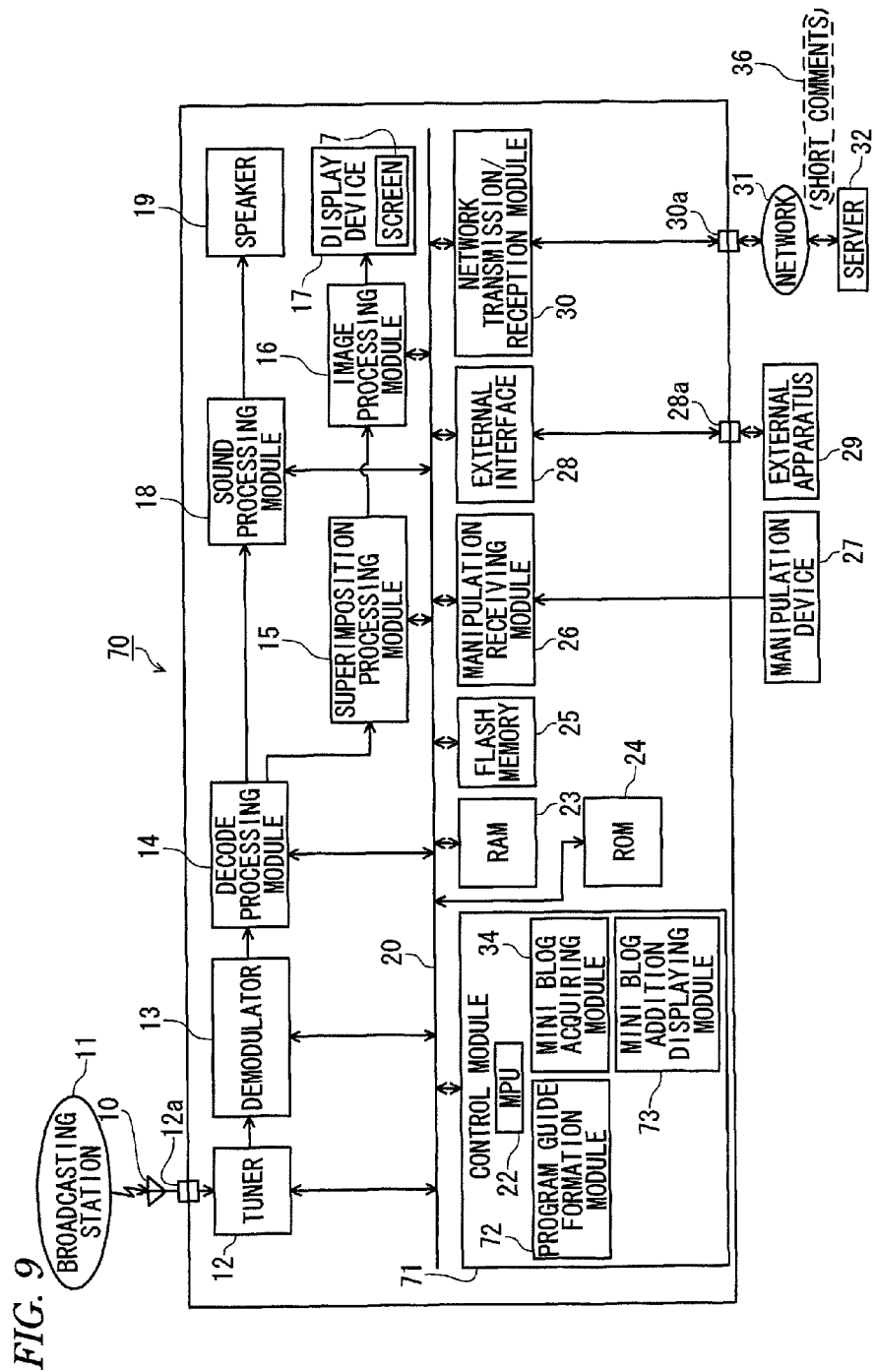
FIG. 9 is a block diagram illustrating a configuration of an information display apparatus according to a second exemplary embodiment.

FIG. 9 is a block diagram illustrating a configuration of an information display apparatus 70 according to a second exemplary embodiment. The same components of the second exemplary embodiment as those of the first exemplary embodiment illustrated in FIGS. 1 and 2 are denoted by the same reference numerals. The second exemplary embodiment is different from the first exemplary embodiment in that the broadcasting station information display 33 is replaced with a program guide formation module 72, and the mini blog displaying module 35 is replaced with a mini blog addition displaying module 73.

The program guide formation module 72 serves to form the program guide from program information of the broadcast program. The program guide formation module 72 acquires service information SI (program arrangement information) of each program and forms a program guide by EPG data based on the SI information. The EPG is provided in order for the user to easily select the program during multi-channel formation. In a newspaper, a display pattern of a television program column is emulated and displayed on the screen 7. The user may select the program, display detailed information or reserve watching and recording by using the remote controller 8 while viewing the program guide of the screen 7. The SI and the program guide information are once stored in the RAM 23 and thereafter, stored in the flash memory 25.

The mini blog addition displaying module 73 serves to display the short comments 36 on a part of the screen where the program guide 74 is displayed. The mini blog addition displaying module 73 displays the short comments 36 retrieved and extracted by the mini blog acquiring module 34 on a space different from the program guide display area by allocating the space for each broadcast station.

Figure 10:
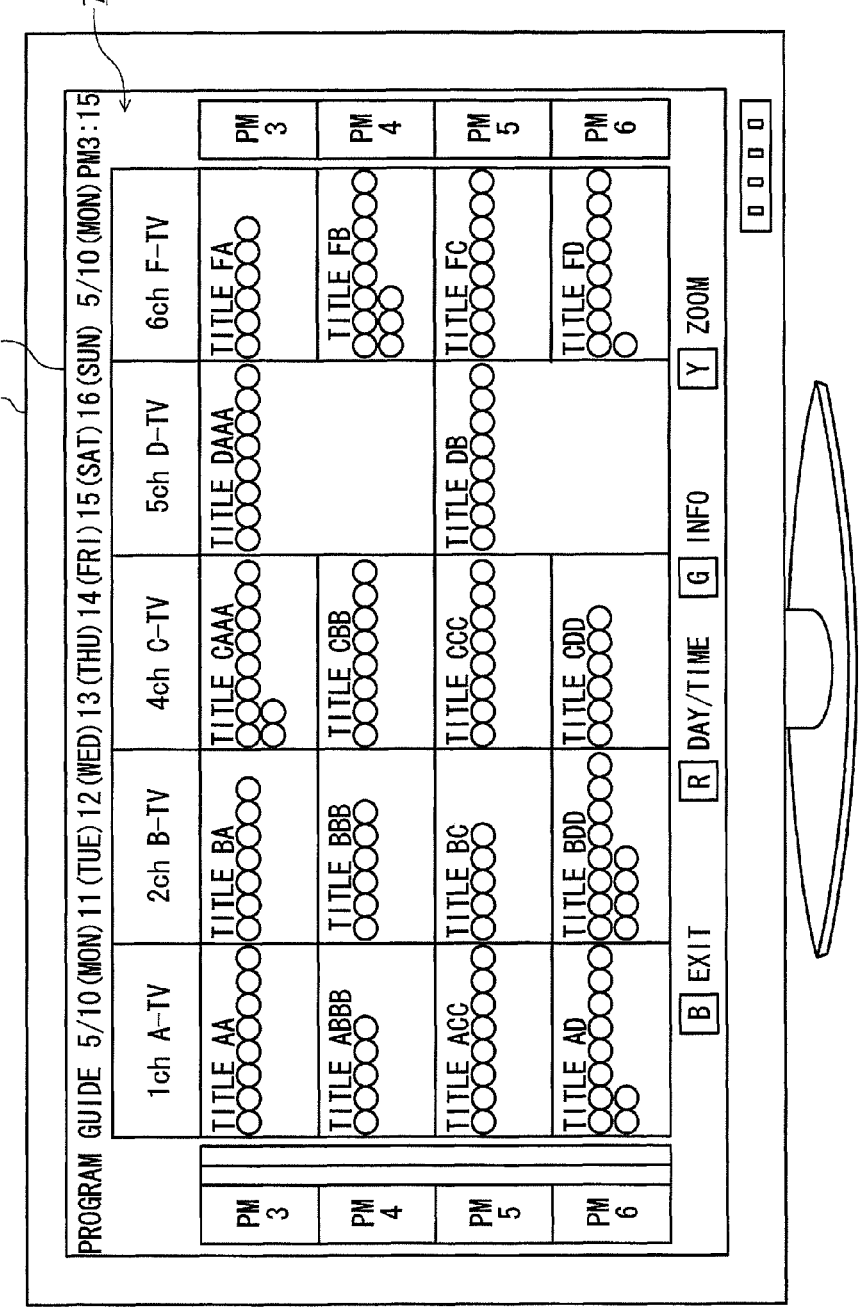
FIG. 10 is a diagram illustrating a state in which a program guide is displayed on a screen.

FIG. 10 is a diagram illustrating a state in which the program guide 74 is displayed on the screen 7. The display pattern of the program guide 74 by the EGP data varies depending on a type of the information display apparatus or a maker of a broadcast receiver, but in the information display apparatus 1, programs to be broadcasted after a present time are displayed in parallel by setting a channel axis in a horizontal direction and a time axis in a vertical direction like the television program column in the newspaper. In FIG. 10, programs after 3:15 p.m. on May 10 (Monday) are displayed. When the program is selected, detailed information including a genre, performers or contents of the program as well as a program title and a broadcasting time of the program is displayed.

The SI is packetized, multiplexed and transmitted like the image and the sound. Data of the program information is included in an event information table (EIT) of the SI. The program guide formation module 72 analyzes information outputted from the decode processing module 14 to form the program guide 74 according to the program, and the control module 21 forms the GUI screen of the program guide. The formed GUI screen is displayed on the screen 7 through the superimposition processing module 15 and the image processing module 16.

Figure 11:
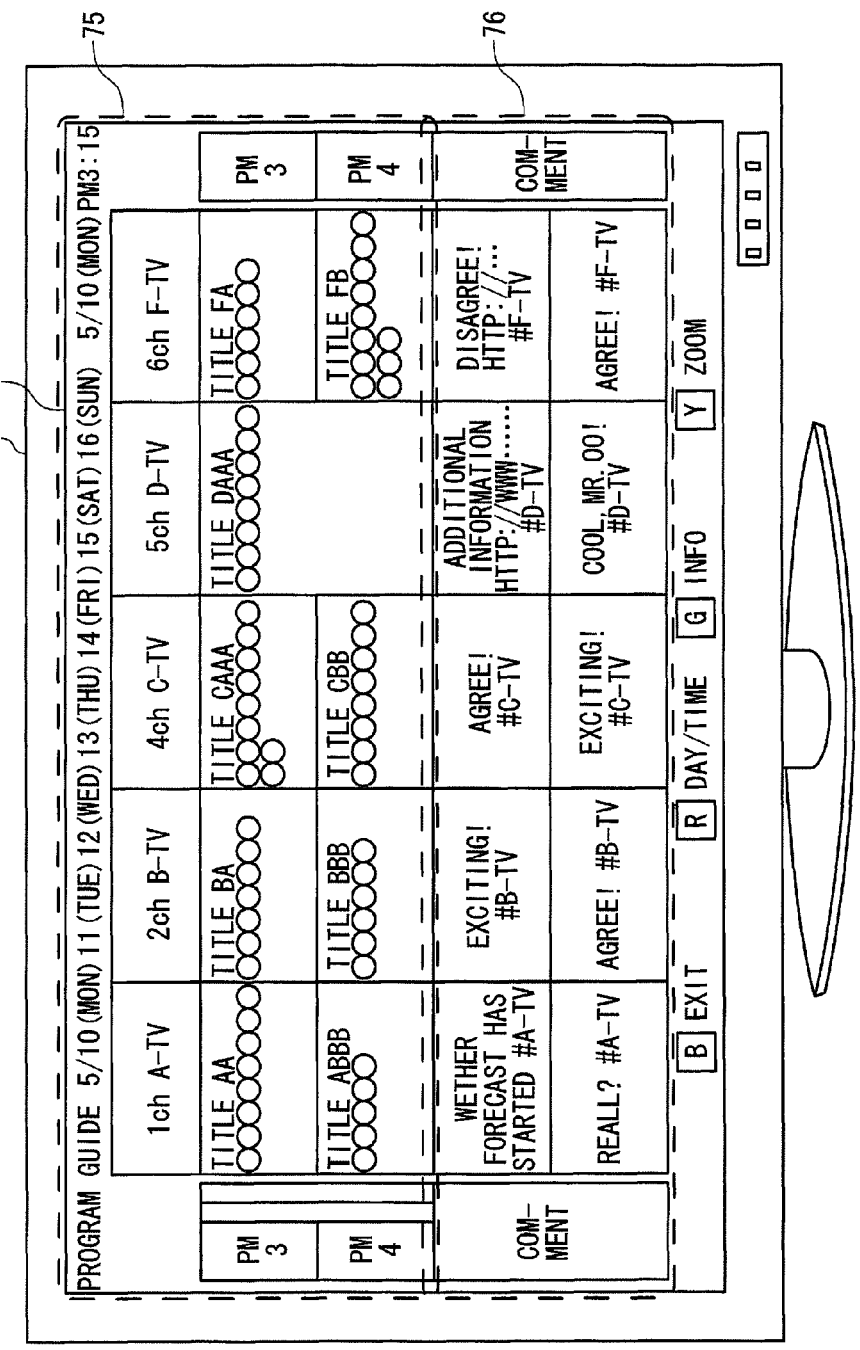
FIG. 11 is a diagram illustrating a state in which the program guide and the short comments are displayed on the screen.

FIG. 11 is a diagram illustrating a state in which the program guide and the short comments are displayed on the screen 7. The mini blog addition displaying module 73 displays the short comments 36 on a part of the screen for each broadcasting station of the program guide. A program guide display area 75 and a short comments display area 76 are placed in the screen 7, and the short comments display area 76 is positioned below the program guide display area 75. The short comments 36 are displayed below the corresponding broadcasting station. The user presses the mini blog display module button of the remote controller 8 while the program guide 74 is being displayed on the screen 7 to display the program guide and the short comments illustrated in FIG. 11.

Third Exemplary Embodiment

Figure 12:
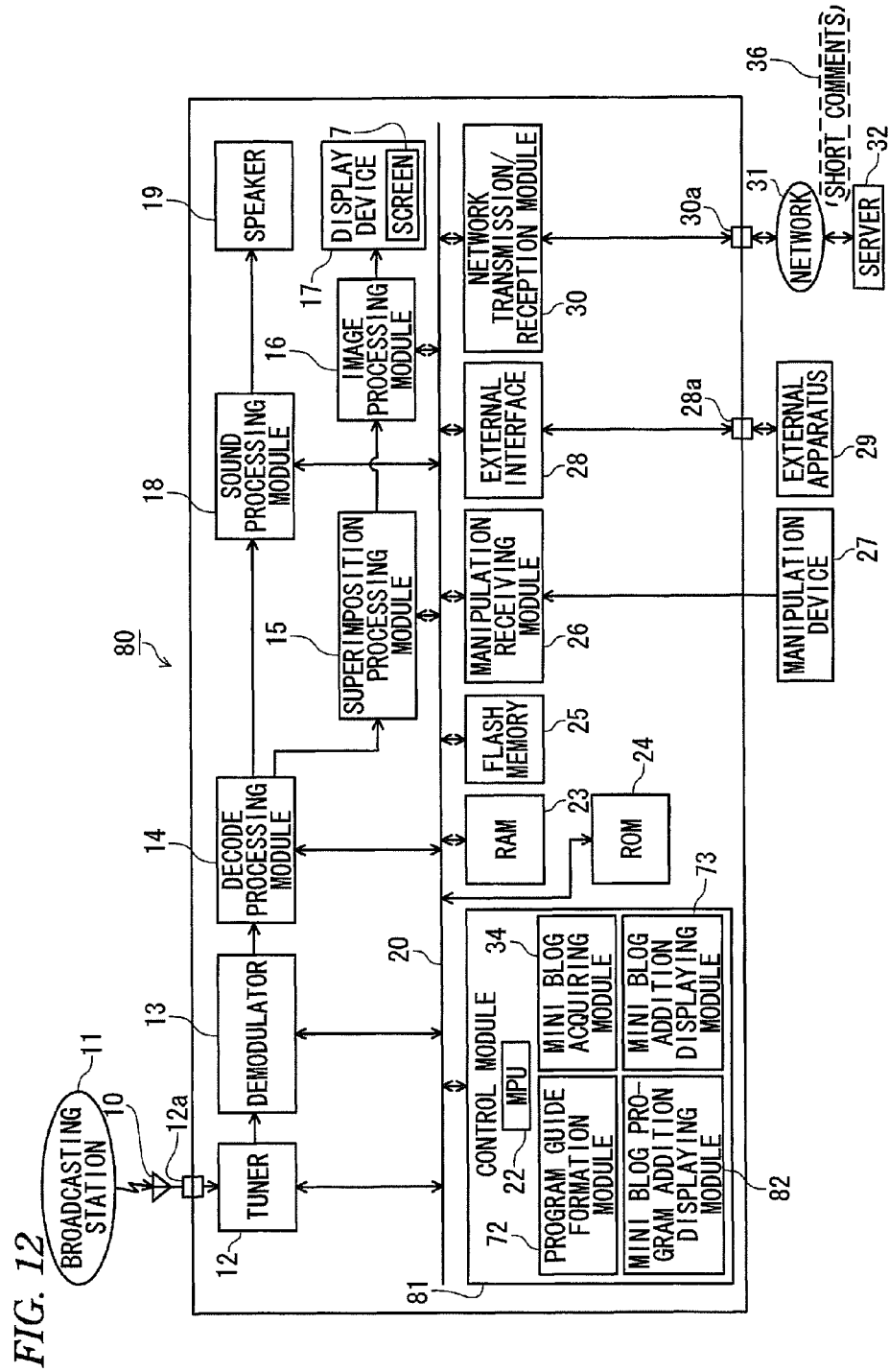
FIG. 12 is a block diagram illustrating a configuration of an information display apparatus according to a third exemplary embodiment.

FIG. 12 is a block diagram illustrating a configuration of an information display apparatus 80 according to a third exemplary embodiment. The same components of the third exemplary embodiment as those of the second exemplary embodiment illustrated in FIG. 9 are denoted by the same reference numerals. The third exemplary embodiment is different from the second exemplary embodiment in that a mini blog addition displaying module 82 is added.

The specific character string included in the short comments 36 may be defined for each broadcast as well as for each broadcasting station in some cases. In the case of the broadcasting station, the specific character string which can be identified as one type of meaning is defined with respect to the broadcasting station, but similar to the case of the broadcast program, the specific character string which is agreed among the users may also be defined with respect to the broadcast program. By using the specific character string with respect to the broadcast program, the short comments for the broadcast program may be retrieved.

The mini blog addition displaying module 82 serves to display the short comments 36 on a part of the screen for each broadcast program of the program guide 74. The mini blog addition displaying module 82 displays the short comments 36 for each broadcast program retrieved and extracted by the mini blog acquiring module 34 in the program guide 74 for each broadcast program.

Figure 13:
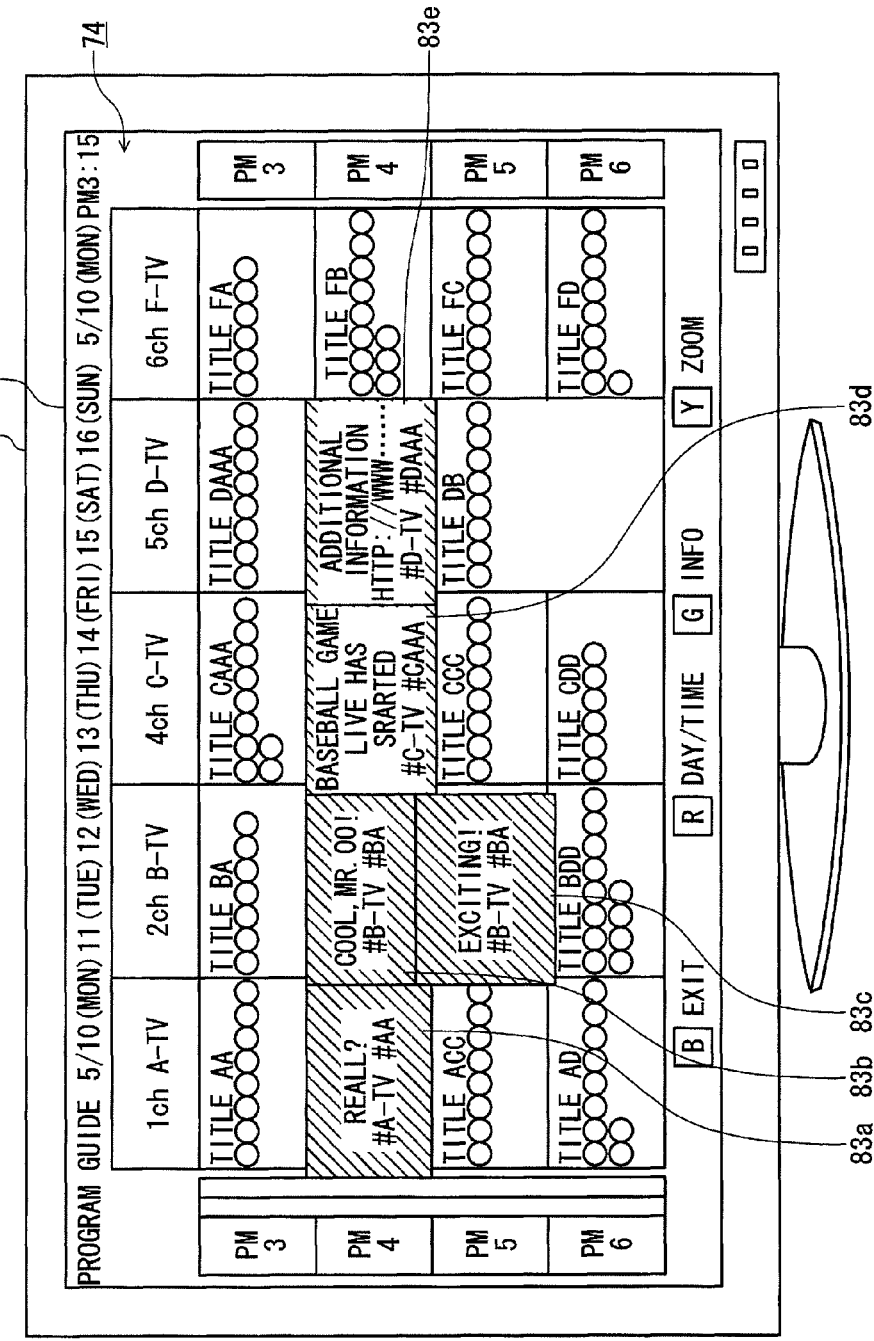
FIG. 13 is a diagram illustrating a state in which the program guide and the short comments for each broadcast program are displayed on a screen.

FIG. 13 is a diagram illustrating a state in which the program guide 74 and the short comments 36 are displayed on the screen 7. For example, short comments 83a, as short comments with respect to a broadcast program of title AA of a 1 ch A-TV, is displayed just below a program column of title AA. Short comments 83b and 83c of title BA of a 2 ch B-TV are displayed in chronological order. Short comments 83d and 83e are short comments of title CAAA and DAAA, respectively.

Fourth Exemplary Embodiment

Figure 14:
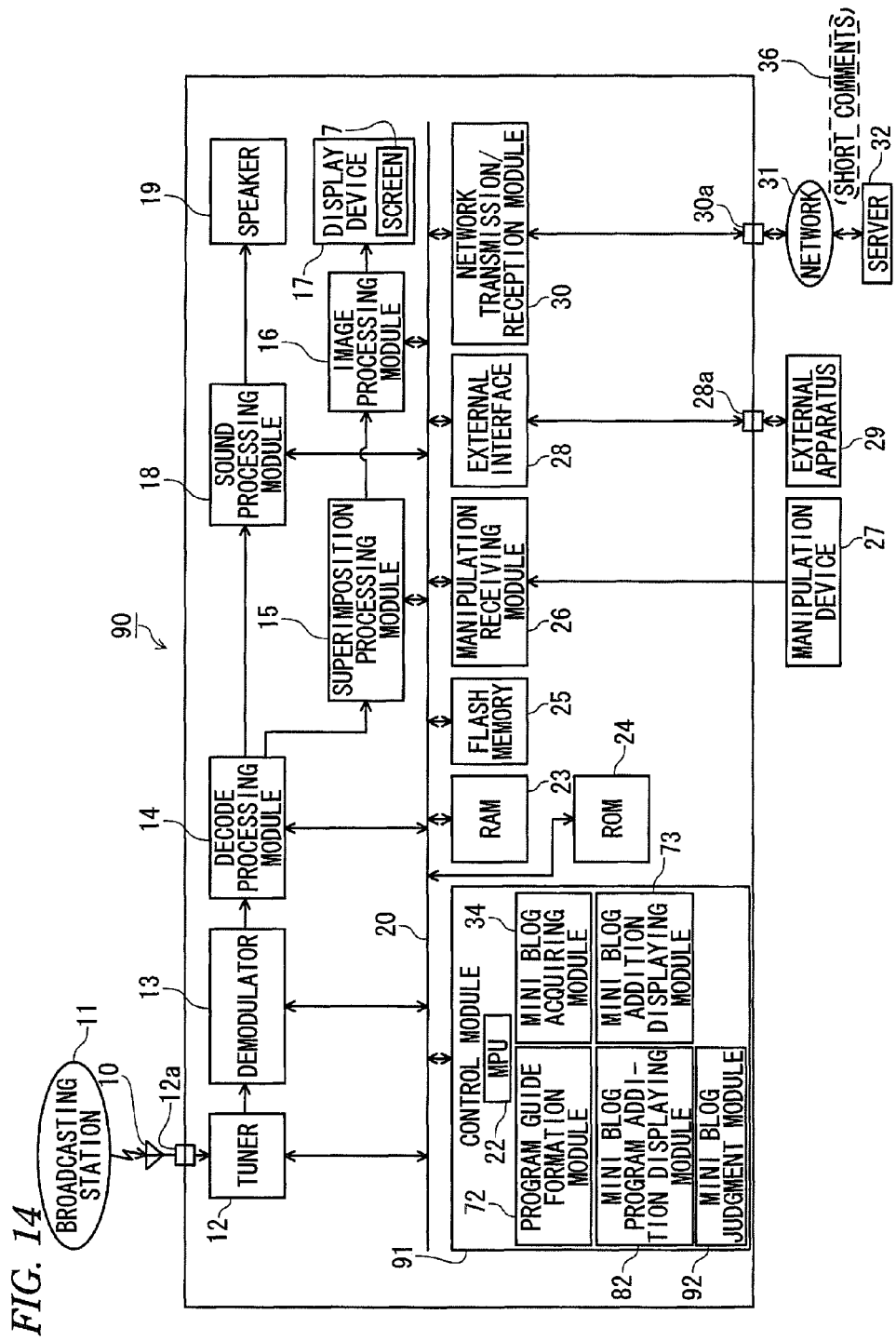
FIG. 14 is a block diagram illustrating a configuration of an information display apparatus according to a fourth exemplary embodiment.

FIG. 14 is a block diagram illustrating a configuration of an information display apparatus 90 according to a fourth exemplary embodiment. The same components of the fourth exemplary embodiment as those of the third exemplary embodiment illustrated in FIG. 12 are denoted by the same reference numerals. The fourth exemplary embodiment is different from the third exemplary embodiment in that a mini blog judgment module 92 is added.

In the third exemplary embodiment, the specific character string with respect to the broadcast program is included in the short comments 36, and the short comments for each broadcast program may be retrieved and extracted from the specific character string. However, when the specific character string with respect to the broadcast program is not included in the short comments 36, broadcast program to which the short comments is posted may not be specified.

The mini blog judgment module 92 serves to compare the short comments with the program information or the SI for each broadcasting station and judge that short comments including the same word as a word included in the program information or the SI as the short comments with respect to the broadcast program. Therefore, even when the specific character string with respect to the broadcast program is not included in the short comments, the broadcast program may be specified. When the same word as the word included in the program information or the SI is not included, the broadcast program may not be specified.

Information regarding each program, which includes the broadcasting station name, the broadcasting time, the program title, a broadcast overview, the performers, details of the program and the like is included in the program information or the SI. By retrieving the short comments with the word extracted from the performers or the program contents, the short comments including the word is judged as the short comments posted with respect to the broadcast program. As a method for extracting the word from the program information or the SI, it is considered to retrieve the word by dividing the short comments into the words by applying morphological analysis and for example, using a noun among the words.

For example, when the short comments of broadcast program title AA of the broadcasting station 1 ch A-TV is retrieved, by further retrieving a plurality of short comments retrieved from the specific character string of the 1 ch A-TV broadcasting station by using, for example, a word contained in program information or SI of a broadcast program corresponding to a present broadcasting time, when the short comments including the word is extracted, the short comments is judged as short comments of the broadcast program corresponding to the present broadcasting time of the broadcast program.

Fifth Exemplary Embodiment

Figure 15:
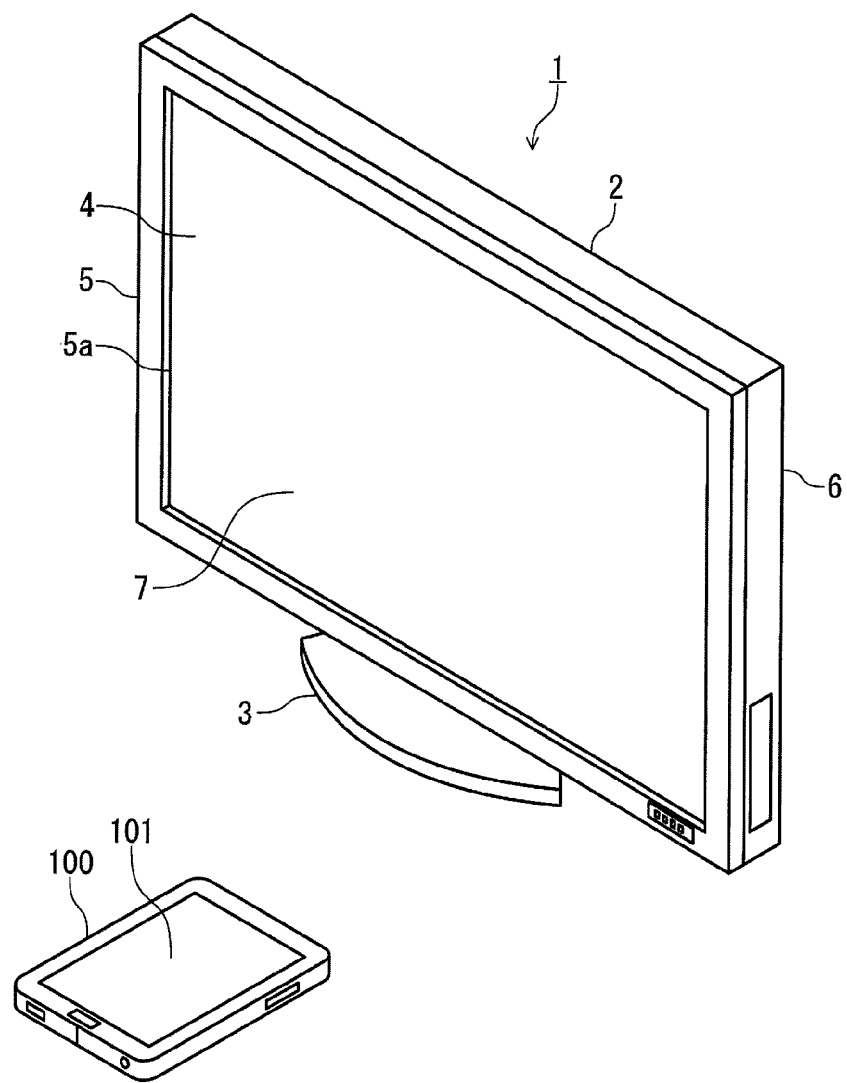
FIG. 15 is an external perspective view of an information display apparatus according to a fifth exemplary embodiment.

FIG. 15 is a block diagram illustrating an external configuration of an information display apparatus 1 according to a fifth exemplary embodiment. The same components of the fifth exemplary embodiment as those of the first exemplary embodiment illustrated in FIG. 1 are denoted by the same reference numerals. The fifth exemplary embodiment is different from the first exemplary embodiment in that a tablet terminal 100 is used instead of the remote controller 8 as the manipulation device of the information display apparatus 1.

The tablet terminal 100 has a network transmission/reception function of a wireless LAN using an IEEE802.11 series communication scheme and is accessible to the network 31 such as the Internet. The tablet terminal 100 serves to acquire the program information regarding the broadcast program from the server on the network 31 and the short comments 36 with respect to the broadcasting station from the server 32 of the website of the mini blog connected through the network 31.

A mini blog list may be displayed on a screen 101 of the tablet terminal 100 similar to the state in which the plurality of broadcasting station names and the short comments 36 for each broadcasting station are displayed as illustrated in FIG. 4. By tabbing the broadcasting station name displayed on a screen 101 of the tablet terminal 100, the broadcast program may be displayed on the screen 7 of the information display apparatus 1. The information display apparatus 1 displays the broadcast program on the screen 7 of the information display apparatus 1 by receiving a command from the tablet terminal 100 through the network transmission/reception module 30.

The present invention is not limited to the above exemplary embodiments as they are, but may be implemented by modifying components without departing from the spirit thereof when embodying the invention. Further, various inventions may be formed by appropriately combining the plurality of components disclosed in the exemplary embodiments. For example, some components may be deleted from all the components disclosed as the exemplary embodiments. In addition, components according to different exemplary embodiments may be appropriately combined.

What is claimed is:

1. An information display apparatus that displays images of broadcast programs on a screen, the information display apparatus comprising:
a broadcasting station information acquiring module that acquires broadcasting station information that is received with the broadcast programs in a transport stream, the broadcasting station information including channel numbers or broadcasting station names for a plurality of broadcasting stations;
a mini blog acquiring module configured to acquire short comments related to one or more channel numbers or broadcasting station names from a plurality of short comments posted to a server of a mini blog website; and
a display controller configured to display the one or more channel numbers or broadcasting station names on a first area of the screen and display the acquired short comments on a second area of the screen, wherein the acquired short comments are arranged in the second area according to an arrangement of the one or more channel numbers or broadcasting station names in the first area.

2. The information display apparatus according to claim 1, wherein the channel numbers or the names are arranged on the first area of the screen in descending order of a number of the acquired short comments.

3. The information display apparatus according to claim 1, wherein if a broadcasting station is selected by an operating device in a state of displaying the channel numbers or the names of the plurality of broadcasting stations on the screen, a broadcast program corresponding to the selected broadcasting station is displayed on the screen.

4. The information display apparatus according to claim 3, wherein when the broadcast program is displayed on the screen, the broadcast program is displayed in a full screen manner.

5. The information display apparatus according to claim 3, wherein when the broadcast program is displayed on the screen, the broadcast program is displayed on a part of the screen.

6. The information display apparatus according to claim 1, wherein the first area of the screen includes at least one of a channel number or the broadcasting station name for each of the plurality of broadcasting stations.

7. An information display apparatus that displays images of broadcast programs on a screen, the information display apparatus comprising:
a broadcasting station information display module that displays broadcasting station information on the screen, the broadcasting station information being received with the broadcast programs in a transport stream, the broadcasting station information including channel numbers or broadcasting station names for a plurality of broadcasting stations;
a mini blog acquiring module configured to acquire short comments related to the broadcasting station information on the screen from a plurality of short comments posted to a server of a mini blog website by using the channel numbers or the broadcasting station names displayed by the broadcasting station information display module; and
a display controller configured to display the acquired short comments on the screen with the related broadcasting station information.

8. The information display apparatus according to claim 7, wherein the display controller displays the acquired short comments on a part of the screen for each of the plurality of broadcasting stations in the program guide.

9. The information display apparatus according to claim 7, further comprising:
the display controller configured to display the acquired short comments on a part of the screen for each of the plurality of broadcasting stations in the program guide.

10. The information display apparatus according to claim 9, further comprising:
a judgment module configured to compare the acquired short comments with the program information for each broadcasting station and judge that the acquired short comments are corresponding to the broadcast program, when the acquired short comments includes the same word as a word included in the program information.

11. The information display apparatus according to claim 7, wherein the program guide includes the channel numbers or names of the plurality of broadcasting stations.

12. An information display method executed by an information display apparatus that displays images of broadcast programs on a screen, the information display method comprising:
receiving broadcast programs in a transport stream;
acquiring broadcasting station information from the transport stream, the broadcasting station information including channel numbers or broadcasting station names for a plurality of broadcasting stations;
acquiring short comments related to one or more channel numbers or broadcasting station names from a plurality of short comments posted to a server of a mini blog website;
displaying the one or more channel numbers or broadcasting station names on a first area of a screen; and
displaying the acquired short comments on a second area of the screen, wherein the acquired short comments are arranged in the second area according to an arrangement of the one or more channel numbers or broadcasting station names in the first area.

13. The information display method according to claim 12, further comprising arranging the channel numbers or the names on the first area of the screen in descending order of a number of the acquired short comments.

14. The information display method according to claim 12, further comprising:
receiving a selection of a broadcasting station from the channel numbers or the names of the plurality of broadcasting stations displayed on the screen, the selection being made by an operating device;
displaying a broadcast program corresponding to the selected broadcasting station on the screen.

15. The information display method according to claim 14, wherein the broadcast program is displayed in a full screen manner.

16. The information display method according to claim 14, wherein the broadcast program is displayed on a part of the screen.

17. An information display method that displays images of broadcast programs on a screen of an information display apparatus, the information display method comprising:
receiving broadcast programs in a transport stream;
acquiring broadcasting station information from the transport stream, the broadcasting station information including channel numbers or broadcasting station names for a plurality of broadcasting stations;
generating a program guide from the broadcasting station information;
acquiring short comments related to the broadcasting station information in the generated program guide; and
displaying the acquired short comments with the program guide on the screen.

18. The information display method according to claim 17, wherein the acquired short comments are displayed on a part of the screen for each of the plurality of broadcasting stations in the program guide.

19. The information display method according to claim 17, further comprising:
comparing the acquired short comments with the program information for each broadcasting station and judging that the acquired short comments are corresponding to the broadcast program when the acquired short comments includes the same word as a word included in the program information.

20. The information display method according to claim 17, wherein the program guide includes the channel numbers or broadcasting station names of the plurality of broadcasting stations.

21. A non-transitory computer readable medium containing instructions which, when executed by a processor, cause the processor to perform an information display method that displays images of broadcast programs on a screen of an information display apparatus, the information display method comprising:
acquiring broadcasting station information that is received with the broadcast programs in a transport stream, the broadcasting station information including channel numbers or broadcasting station names for a plurality of broadcasting stations;
acquiring short comments related to one or more channel numbers or broadcasting station names from a plurality of short comments posted to a server of a mini blog website;
displaying the one or more channel numbers or broadcasting station names on a first area of a screen; and
displaying the acquired short comments on a second area of the screen, wherein the acquired short comments are arranged in the second area according to an arrangement of the one or more channel numbers or names in the first area.

22. The non-transitory computer readable medium of claim 21, wherein the information display method further comprises arranging the channel numbers or the names on the first area of the screen in descending order of a number of the acquired short comments.

23. The non-transitory computer readable medium of claim 21, wherein the information display method further comprises:
receiving a selection of a broadcasting station from the channel numbers or the names of the plurality of broadcasting stations displayed on the screen, the selection being made by an operating device;
displaying a broadcast program corresponding to the selected broadcasting station on the screen.

24. The non-transitory computer readable medium of claim 23, wherein the information display method further comprises displaying the broadcast program on a part of the screen.

25. The non-transitory computer readable medium of claim 23, wherein the information display method further comprises displaying the broadcast program in a full screen manner.

26. A non-transitory computer readable medium containing instructions which, when executed by a processor, cause the processor to perform an information display method that displays images of broadcast programs on a screen of an information display apparatus, the information display method comprising:

receiving broadcast programs in a transport stream;

acquiring broadcasting station information from the transport stream, the broadcasting station information including channel numbers or broadcasting station names for a plurality of broadcasting stations;

generating a program guide from the broadcasting station information;

acquiring short comments related to the broadcasting station information in the generated program guide; and displaying the acquired short comments with the program guide on the screen.

27. The non-transitory computer readable medium of claim 26, wherein the information display method further comprises displaying the acquired short comments on a part of the screen for each of the plurality of broadcasting stations in the program guide.

28. The non-transitory computer readable medium of claim 27, wherein the information display method further comprises:

comparing the acquired short comments with the program information for each broadcasting station and judging that the acquired short comments are corresponding to the broadcast program when the acquired short comments includes the same word as a word included in the program information.

29. The non-transitory computer readable medium of claim 26, wherein the information display method further comprises obtaining information regarding the channel numbers or names of the plurality of broadcasting stations from the program guide.

* * * * *